Figure 1:
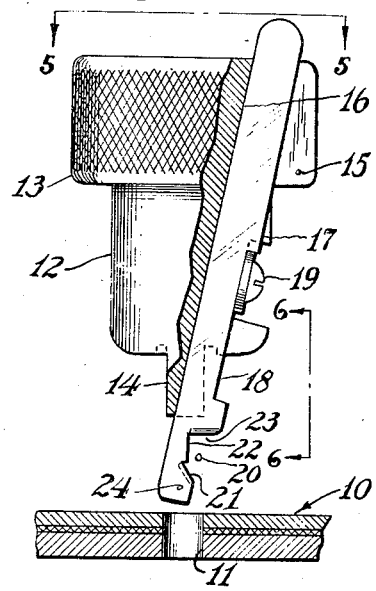

June 15, 1943.   N. L. KEARNEY ET AL   2,322,141
REVERSE COUNTERSINK
Filed May 2, 1941

INVENTORS
NORMAN L. KEARNEY AND
BY HARRISON L. RICHARDSON
ATTORNEY

Patented June 15, 1943

2,322,141

UNITED STATES PATENT OFFICE 2,322,141

REVERSE COUNTERSINK

Norman L. Kearney and Harrison L. Richardson, Buffalo, N. Y., assignors to Curtiss-Wright Corporation, a corporation of Delaware Application May 2, 1941, Serial No. 391,459

10 Claims. (Cl. 77—73.5)

This invention relates to countersinking tools and is concerned particularly with a special form of tool for countersinking the back surface of a drilled sheet member by insertion of the tool from the front face of the member through the drilled hole.

Although the invention has general application where countersinking of chamfering of the edge of a hole is desired, it finds particular utility in the aircraft art and in the repair of aircraft structure. As is well known, present day aircraft are fabricated largely from metal components and many of the structures are riveted to one another in such fashion that the back surface of the structure is not available to a mechanic for backing up the rivet. To meet this problem, various types of "blind" rivets have been evolved and one type of such rivet is the so-called explosive rivet wherein a small explosive charge is carried in the hollow shank of the rivet. After insertion of such rivet, the rivet is heated and the rivet shank is opened up by the explosive charge to secure the rivet in place. Since the explosive charge acts in equal directions in the rivet shank cavity, a considerable shear stress is imposed on the rivet material and, if the rivet be inserted through a sharp edged hole in a structure, there is considerable likelihood that the rivet shank material, when expanded by the explosion, will be so deformed by the edge of the surrounding structure that it will not form a joint of adequate strength. It has been found that countersinking or chamfering the inner edge of the structure allows for expansion of the rivet shank material without large stress concentration either in the rivet shank material or in the surrounding structure and it is as a result of the above practice that it was necessary to develop a simple and effective tool by which back countersinking could be effected. It is probable that back countersinking could be applied with constructive results where other forms of "blind" or "one side" rivets are used.

Thus, it is an object of the invention to provide a simple hand tool by which a rear or unavailable face of a structure may be countersunk at the edge of a drilled hole therethrough. It is a further object of the invention to provide a tool whose depth of cut to effect a proper countersink is established automatically without need for subsequent inspection or gaging. Still another object is to provide a back countersinking tool which is so simple in its structure that it may be easily and cheaply manufactured, with a minimum of critical tolerances.

Figure 5:
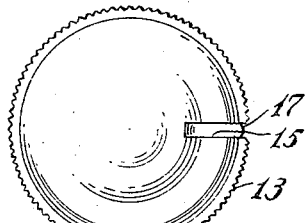
Figure 6:
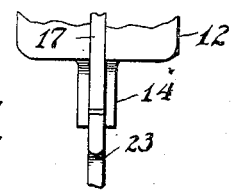

Further objects of the invention will become apparent in reading the annexed description in connection with the drawing, in which:

Figs. 1 to 4 inclusive show the back countersinking tool, partly in section, in successive stages of application to a work sheet;

Figs. 5 and 6 are views on the lines 5—5 and 6—6 of Fig. 1; and

Figure 4:
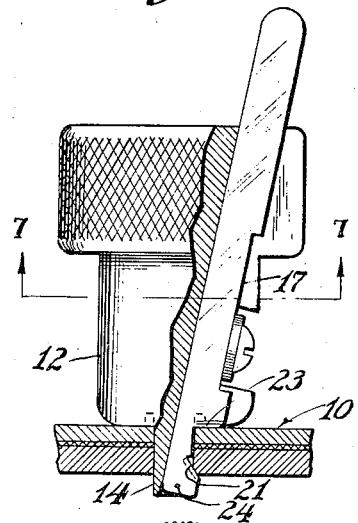
Figure 7:
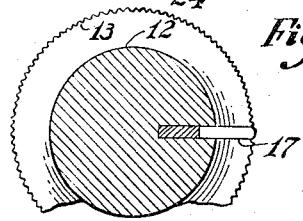

Fig. 7 is a section on the line 7—7 of Fig. 4.

The member 10 indicates a work sheet comprising superposed layers of material having formed therein a drilling 11. It is presumed that the upper surface of the member 10 is accessible whereas the lower surface of the member is inaccessible, and that it is desired to countersink or chamfer the edge of the hole 11 at the lower surface of the member. The countersinking tool by which this operation may be performed comprises a body member 12 having a knurled knob 13, the lower end of the body 12 being provided with a pilot stem 14 of such diameter as to have running clearance in the hole 11. A slot 15 is formed in the elements 12, 13 and 14 the bottom 16 of which is sloped or slanted so that the slot depth at the bottom of the stem 14 is somewhat greater than the radius of the stem, and the slot bottom toward the top of the tool lies radially more remote from the stem center line than the slot bottom at the stem. In this slot is disposed a blade 17 which rests against the slot bottom 16 and is slidable along the slot bottom, the back edge of the blade being straight to have bearing throughout the length of the slot bottom. The blade 17 is provided with a cutout 18 the outer surface of which is engaged by a retaining screw 19 secured in the tool body 12, whereby the blade 17 may be moved up and down within the limits established by the length of the cutout 18 and the abutment of the ends of the cutout with the screw 19.

The bottom of the blade 17 is notched as at 20, the notch having three sides 21, 22, and 23. The side 21 is formed as a cutting edge which is sloped with respect to the axis of the stem 14 in accordance with the desired angle of the countersink or chamfer which is desired in the member 10. The side 22 is parallel to the axis of the stem 14 while the side 23 is normal to the axis of the stem 14. The lower end 24 of the blade 17, adjacent the side 21, is of such width that it will pass easily through the hole 11. As will be apparent, the width of the blade 17 adjacent the side 22 of the notch 20 is somewhat reduced and the proportions of the blade and notch will be so chosen that, when the blade side 23 is flush with the bottom surface of the body 12, the side 22 will lie flush with the cylindrical surface of the stem 14, and the cutting edge 21 will lie within the confines of the material of the member 10 adjacent the inaccessible edge of the hole 11.

Figure 2:
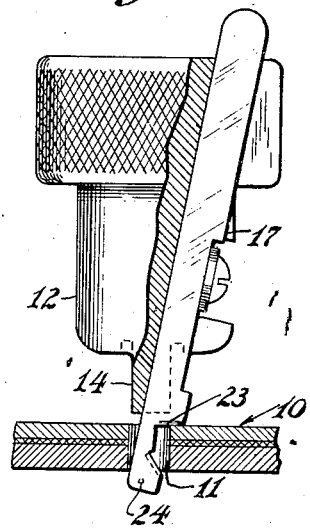
Figure 3:
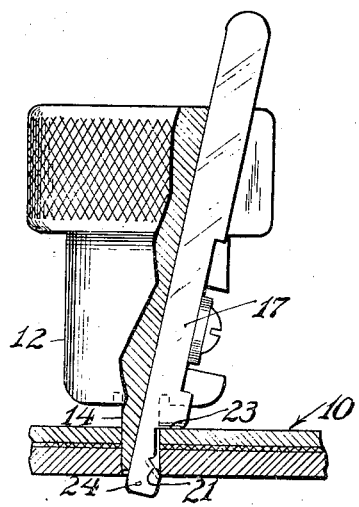

In using the tool, the blade 17 is first pushed downwardly as in Fig. 1, and the bottom of the blade 17 is inserted through the hole 11 as in Fig. 2 until the notch side 23 engages the top of the member 10. Then, the knurled head 13 is pressed downwardly and the stem 14 is engaged with the hole 11 as in Fig. 3 during which movement, the body and head 12, 13, with the stem 14, move downwardly with respect to the blade 17 which may not move down due to the abutment of the notch side 23 with the face of the member 10. This will cause radially outward movement of the cutting edge 21 with respect to the stem 14, due to blade movement along the sloped groove bottom 16, until said cutting edge engages the bottom edge of the hole 11. Thereupon, the tool assembly may be rotated by means of the knurled head 13, while pressing the tool downwardly against the member 10, during which operation the cutting edge scrapes or cuts material from the member 10 to form the countersink. The final position of the tool is shown in Fig. 4 wherein the bottom surface of the body 12 rests against the top surface of the member 10 and wherein the cutting edge has moved radially outward with respect to the stem 14 the maximum distance which it may move, whereby the full available countersink is formed. It is apparent that by bottoming the body 12 against the sheet, a determinate depth of countersink is cut. Withdrawal of the tool is accomplished by merely pulling up on the knurled head 13 which extracts the stem 14 from the hole 11, at the same time leaving the blade 17 in contact with the countersunk edge of the hole until such time as the stem has been fully withdrawn from the member 10 after which the blade bottom may be unhooked from the sheet member and withdrawn from the hole 11.

It is obvious that not only the slope but also the form of the cutting edge 21 may be varied to suit the character of work which is desired and also, the general proportions and arrangement of the countersinking tool may be varied materially to suit any given problem. It is quite conceivable that a shank, not shown, may be incorporated in lieu of the knurled head 13 whereby the tool may be operated by a portable drill or the like. It is likewise conceivable that other arrangements could be used to attain radial feeding movement of the cutting edge 21 in response to axial feeding movement of the stem 14 into the hole.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. A back countersink tool for example for countersinking holes on surfaces opposite the tool holder, comprising a body, a stem depending from said body, a groove in one side of said body and said stem, the side faces of said groove being in parallel relation to the longitudinal axis of the body, the bottom face of the groove being in angular relation to the longitudinal axis of said body, said groove beginning at the said stem and sloping outwardly and upwardly, a tool bit slidably mounted in said groove, said bit having a three-sided notch adjacent one end, two faces of the notch forming stops and the other face being angled and provided with a cutting edge, said notched end being adjacent the said stem.

2. A tool for chamfering the back edge of a hole in a sheet, comprising a body having a pilot stem insertable into said hole, said body and stem having a guideway therein which is angled relative to the stem-axis, a slide reciprocable in said guideway, projectible beyond the end of the stem and insertable through the hole in advance of stem insertion therethrough, and a cutting edge on the end of the slide engageable with the far edge of the hole, said slide having an abutment engageable with the near surface of the sheet upon initiation of stem insertion by which the cutting edge is engaged with the back hole edge upon further insertion of the stem through the sheet.

3. In a back countersinking tool for the edges of holes in sheets, a turnable tool holder including a pilot stem engageable in a sheet hole, an angled cutter insertable through the hole in advance of the stem and movable with and with respect thereto, means responsive to insertion of the stem into the hole to move said angled cutter into engagement with the back edge of the hole, and abutments on the stem and cutter engageable with the sheet surface to limit the depth of insertion of the stem and thus the depth of cut of said cutter at the back edge of the hole.

4. In a back countersinking tool for the edges of holes in sheets, a cutter bar having a three-sided notch toward one end, the bottom side of said notch comprising a slanted cutting edge and the other two sides having right angled relation and being adapted to bear upon the wall of the sheet hole and the top face of the sheet, and a pilot stem insertable into the hole and having a groove to which said bar is fitted, said groove having a sloped bottom face along which said bar is slidable as the stem is moved axially through said hole.

5. In a back countersinking tool for the edges of holes in sheets, a cutter bar having a three-sided notch toward one end, the bottom side of said notch comprising a slanted cutting edge and the other two sides having right angled relation and being adapted to bear upon the wall of the sheet hole and the top face of the sheet, and a pilot stem insertable into the hole and having a groove to which said bar is fitted, said stem comprising an axially movable and rotatable wedge to enforce movement of the cutting edge of the bar into contact with the back edge of the sheet hole.

6. In a back countersinking tool for the edges of holes in sheets, a cutter bar having a three-sided notch toward one end, the bottom side of said notch comprising a slanted cutting edge and the other two sides having right angled relation and being adapted to bear upon the wall of the sheet hole and the top face of the sheet, and a pilot stem insertable into the hole and having a groove to which said bar is fitted, said stem comprising an axially movable and rotatable wedge to enforce movement of the cutting edge of the bar into contact with the back edge of the sheet hole after contact of the third side of said bar notch with the top surface of the sheet being worked upon.

7. A tool comprising a pilot stem having a sloped-bottom groove therein, a tool bit slidable in said groove and rotatable with said stem, the end of said bit having a width no greater than the stem diameter to allow of insertion of the bit and stem into a hole in a work piece, said bit having a cutting edge near its end engageable with the work piece, inwardly of the work piece surface, and an abutment on said bit engageable with the outer surface of the work piece to limit the depth of insertion of the bit, said bit after said limited insertion, being movable radially into work piece engagement by inward movement of said stem and camming action of the sloped groove-bottom thereon.

8. A tool comprising a stem having a groove in one side thereof, the bottom face of said groove being in angular relation to the stem axis, a tool bit slidably mounted in said groove, the end of said bit having a cutting edge engageable with the wall of a work-piece hole after insertion of the bit and stem into the hole, and an abutment on the bit engageable with the outer surface of the work-piece to limit the depth of insertion of the bit into the hole, said bit being movable radially after said limited insertion by continued insertion of the stem through the hole.

9. A tool comprising a pilot stem insertable into a hole in a work piece, a tool bit mounted on the stem for rotational movement therewith and for axial movement with respect thereto, an abutment on the bit, spaced from one end, said abutment serving to limit the amount of bit insertion into the hole by the stem, a cutting edge toward the end of said bit engageable with the hole wall, and means acting between the bit and stem to enforce radial movement of the bit relative to the stem as the stem itself is fed into the hole.

10. In a back countersinking tool for the edges of holes in sheets, a turnable tool holder including a pilot stem engageable in a sheet hole, an angled cutter insertable through the hole in advance of the stem and movable with and with respect thereto, means on the cutter engageable with the surface of the sheets to limit the extent of axial movement of the cutter into the hole, and means responsive to insertion of the stem into the hole to move said angled cutter radially into engagement with the back edge of the hole.

NORMAN L. KEARNEY.
HARRISON L. RICHARDSON.